United States Patent
Xiao (10) Patent No.: US 11,875,577 B2
(45) Date of Patent: Jan. 16, 2024

(54) METHOD AND SYSTEM FOR RECOGNIZING TRAFFIC LIGHTS USING A HIGH-PRECISION MAP

(71) Applicant: SHENZHEN GUO DONG INTELLIGENT DRIVE TECHNOLOGIES CO., LTD, Shenzhen (CN)

(72) Inventor: Jianxiong Xiao, Shenzhen (CN)

(73) Assignee: SHENZHEN GUO DONG INTELLIGENT DRIVE TECHNOLOGIES CO., LTD, Shenzhen (CN)

(*) Notice: Subject to any disclaimer, the term of this patent is extended or adjusted under 35 U.S.C. 154(b) by 0 days.

(21) Appl. No.: 17/342,549

(22) Filed: Jun. 9, 2021

(65) Prior Publication Data

US 2022/0222476 A1    Jul. 14, 2022

(30) Foreign Application Priority Data

Jan. 8, 2021 (CN) ......................... 202110026373.6

(51) Int. Cl.
*G06V 20/58* (2022.01)
*G06V 20/40* (2022.01)
(Continued)

(52) U.S. Cl.
CPC .......... *G06V 20/584* (2022.01); *G05D 1/0246* (2013.01); *G06V 20/46* (2022.01); *G08G 1/09623* (2013.01)

(58) Field of Classification Search
CPC .... G06V 20/584; G06V 20/46; G05D 1/0246; G08G 1/09623; G08G 1/01; G08G 1/095; G08G 1/133; G01C 21/32
See application file for complete search history.

(56) References Cited

U.S. PATENT DOCUMENTS 11,069,234 B1 * 7/2021 Mulligan ................. G08G 1/08
2014/0046509 A1 * 2/2014 Otake .............. G08G 1/096783
                                                        701/2
(Continued)

FOREIGN PATENT DOCUMENTS

CN          104658290 A        5/2015
CN          108305475 A   *    7/2018   ......... G08G 1/09623
(Continued)

OTHER PUBLICATIONS

D. Nienhüser, M. Drescher and J. M. Zöllner, "Visual state estimation of traffic lights using hidden Markov models," 13th International IEEE Conference on Intelligent Transportation Systems, 2010, pp. 1705-1710, doi: 10.1109/ITSC.2010.5625241. (Year: 2010).*

(Continued)

*Primary Examiner* — Marnie A Matt (57) ABSTRACT

A generation method of high-precision map for recognizing traffic lights is provided. The generation method comprised steps of: obtaining road test data comprising video data of traffic lights; marking the video data in order to obtain marked data of the traffic lights, the marked data comprising states of the traffic lights and traffic lights information; using the video data and the marked data to generate a recognition model of the traffic lights; and storing the recognition model and the traffic lights information in a high-precision map to generate a high-precision map for recognizing the traffic lights. Furthermore, a method and system for recognizing traffic lights using high-precision map are also provided. The recognition model is stored in the high-precision map, and cooperating with the high-precision map to effectively recognize the traffic lights.

12 Claims, 4 Drawing Sheets

(51) Int. Cl.
*G05D 1/02* (2020.01)
*G08G 1/0962* (2006.01)

(56) References Cited

U.S. PATENT DOCUMENTS

| | | | | |
|---|---|---|---|---|
| 2015/0009318 A1* | 1/2015 | Peng | .................... | G06V 20/584 |
| | | | | 348/119 |
| 2019/0080186 A1* | 3/2019 | Zhai | ........................ | G06F 16/29 |
| 2020/0238996 A1* | 7/2020 | Pendleton | ....... | B60W 30/18159 |
| 2020/0312127 A1* | 10/2020 | Doemling | .......... | G01C 21/3691 |
| 2020/0353932 A1* | 11/2020 | Wang | ....................... | G08G 1/04 |
| 2021/0056850 A1* | 2/2021 | Ichikawa | ........... | G01C 21/3691 |
| 2021/0261152 A1* | 8/2021 | Meijburg | ................. | G08G 1/08 |

FOREIGN PATENT DOCUMENTS

| | | | | |
|---|---|---|---|---|
| CN | 110888434 A | | 3/2020 | |
| CN | 112418031 A | * | 2/2021 | ......... G06K 9/00825 |

OTHER PUBLICATIONS

L. C. Possatti et al., "Traffic Light Recognition Using Deep Learning and Prior Maps for Autonomous Cars," 2019 International Joint Conference on Neural Networks (IJCNN), 2019, pp. 1-8, doi: 10.1109/IJCNN.2019.8851927. (Year: 2019).*

J.-G. Wang and L.-B. Zhou, "Traffic Light Recognition With High Dynamic Range Imaging and Deep Learning," in IEEE Transactions on Intelligent Transportation Systems, vol. 20, No. 4, pp. 1341-1352, Apr. 2019, doi: 10.1109/TITS.2018.2849505. ( Year: 2019).*

L. Yang, X. Wang and J. Wang, "Deep Traffic Light Perception with Spatiotemporal Analysis for Autonomous Driving," 2020 European Control Conference (ECC), 2020, pp. 1086-1091, doi: 10.23919/ECC51009.2020.9143756. (Year: 2020).*

* cited by examiner

METHOD AND SYSTEM FOR RECOGNIZING TRAFFIC LIGHTS USING A HIGH-PRECISION MAP

CROSS REFERENCE TO RELATED APPLICATION

This non-provisional patent application claims priority under 35 U.S.C. § 119 from Chinese Patent Application No. 202110026373.6 filed on Jan. 8, 2021, the entire content of which is incorporated herein by reference.

TECHNICAL FIELD

The disclosure relates to the field of autonomous driving technology, and in particular to a generation method of high-precision map, a method and a system for recognizing traffic lights using the same.

BACKGROUND

With the rapid development of social economy, more and more people use vehicles in their daily life. The vehicles are convenient for people, but nowadays hidden danger of traffic safety caused by vehicles becomes increasingly prominent. Therefore, assisted driving and autonomous driving gradually have become popular research topics. Traffic lights signal recognition technology is an essential technology of intelligent driving system which using for the assisted driving or the autonomous driving. Accurate recognition of traffic lights signals plays a key role in intelligent driving system for outdoor navigation.

A high-precision map is one of the core technologies in the field of autonomous driving technology, and it is also the key technology node to achieve autonomous driving. The development of high-precision map directly affects the safety and accuracy of autonomous driving.

Therefore, how to recognize traffic lights signals with high-precision map is the problem to be solved in this case.

SUMMARY

The disclosure provides a generation method of high-precision map for recognizing traffic lights and a method and a system for recognizing traffic lights using high-precision map. The generation method can realize the recognition of traffic lights signals combined with high-precision map effectively.

A first aspect of the disclosure provides a generation method of high-precision map for recognizing traffic lights, and the generation method of high-precision map includes the steps of: obtaining road test data comprising video data of traffic lights; marking the video data in order to obtain marked data of the traffic lights, the marked data comprising states of the traffic lights and traffic lights information; using the video data and the marked data to generate a recognition model of the traffic lights; and storing the recognition model and the traffic lights information in a high-precision map to generate a high-precision map for recognizing the traffic lights.

A second aspect of the disclosure provides a method for recognizing traffic lights using high-precision map, wherein the high-precision map having a recognition model for recognizing traffic lights, the method for recognizing traffic lights using high-precision map includes the steps of: obtaining location information of a vehicle at the current moment; judging whether there is a traffic light within a preset range according to the location information and the high-precision map; extracting the recognition model of the traffic lights from the high-precision map when there is a traffic light within the preset range; controlling camera devices to take images of the traffic lights, and obtaining the images; obtaining time of the current moment; and using the images, the time of the current moment, and the recognition model to recognize the state of the traffic lights.

A third aspect of the disclosure provides a system for recognizing traffic lights using high-precision map, the system comprises: a camera device and a main control device. The main control device comprises a memory configured to store program instructions, and a processor configured to execute the program instructions to perform method for recognizing traffic lights using high-precision map, and the method for recognizing traffic lights using high-precision map comprises the steps of: obtaining the location information of the vehicle at the current moment; judging whether there is a traffic light within the preset range according to the location information and the high-precision map; extracting the recognition model of the traffic lights from the high-precision map when there is a traffic light within the preset range; controlling the camera device to take images of the traffic lights, and obtaining the images; obtaining the time of the current moment; and using the images, the time of the current moment, and the recognition model to recognize the state of the traffic lights.

The generation method of high-precision map for recognizing traffic lights and method and system for recognizing traffic lights using high-precision map, can use road test data to generate the recognition model of the traffic lights, and store the recognition model in a high-precision map to generate a high-precision map for recognizing traffic lights. The solution can realize the recognition of traffic lights combined with high-precision map effectively, and can recognize a variety of different traffic lights, and has a wide range of applications.

BRIEF DESCRIPTION OF THE DRAWINGS

In order to illustrate the technical solution in the embodiments of the disclosure or the prior art more clearly, a brief description of drawings required in the embodiments or the prior art is given below. Obviously, the drawings described below are only some of the embodiments of the disclosure. For ordinary technicians in this field, other drawings can be obtained according to the structures shown in these drawings without any creative effort.

DETAILED DESCRIPTION OF THE EMBODIMENTS

In order to make the purpose, technical solution and advantages of the disclosure more clearly, the disclosure is further described in detail in combination with the drawings and embodiments. It is understood that the specific embodiments described herein are used only to explain the disclosure and are not used to define it. On the basis of the embodiments in the disclosure, all other embodiments obtained by ordinary technicians in this field without any creative effort are covered by the protection of the disclosure.

The terms "first", "second", "third", "fourth", if any, in the specification, claims and drawings of this application are used to distinguish similar objects and need not be used to describe any particular order or sequence of priorities. It should be understood that the data used here are interchangeable where appropriate, in other words, the embodiments described can be implemented in order other than what is illustrated or described here. In addition, the terms "include" and "have" and any variation of them, can encompass other things. For example, processes, methods, systems, products, or equipment that comprise a series of steps or units need not be limited to those clearly listed, but may include other steps or units that are not clearly listed or are inherent to these processes, methods, systems, products, or equipment.

It is to be noted that the references to "first", "second", etc. in the disclosure are for descriptive purpose only and neither be construed or implied the relative importance nor indicated as implying the number of technical features. Thus, feature defined as "first" or "second" can explicitly or implicitly include one or more such features. In addition, technical solutions between embodiments may be integrated, but only on the basis that they can be implemented by ordinary technicians in this field. When the combination of technical solutions is contradictory or impossible to be realized, such combination of technical solutions shall be deemed to be non-existent and not within the scope of protection required by the disclosure.

Figure 1:
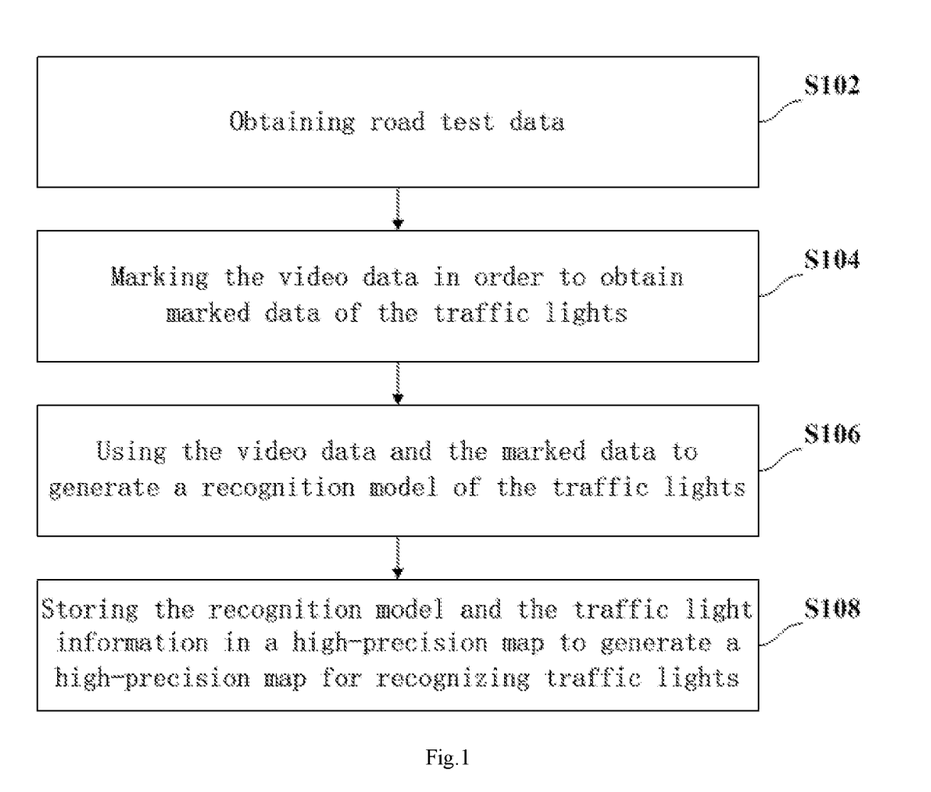
FIG. 1 illustrates the generation method of high-precision map in accordance with an embodiment.

Referring to FIG. 1, FIG. 1 illustrates the generation method of high-precision map in accordance with an embodiment. The high-precision map generated by the generation method of high-precision map can be used to recognize traffic lights. The generation method of high-precision map for recognizing traffic lights includes the following steps.

In step S102, obtaining road test data. The road test data comprises video data of each traffic light. In this embodiment, the road test data can be collected by a data acquisition vehicle. In detail, the data acquisition vehicle is equipped with camera device, and the data acquisition vehicle continuously drives at an intersection at different times every day. The data acquisition vehicle takes videos about the traffic lights by the camera device while driving. The video data corresponding to each traffic light can be extracted from the video taken according to location information of the data acquisition vehicle and a map. Or the video data corresponding to each traffic light is outputted from a deep learning model that generates the video data when the video taken by camera device is inputted into the deep learning model.

In step S104, marking the video data in order to obtain marked data of the traffic lights. In this embodiment, a plurality of video frames generated in different time periods are selected and mark state of traffic lights in the plurality of the video frames. The different time periods may be but not limited to different traffic flow periods, such as morning rush hour, evening rush hour, and flat peak, etc. The method of marking the states of the traffic lights can be manual marking or semi-autonomous marking. In this embodiment, semi-autonomous marking is automatically marked by computer, and then manually checked. The marked data includes the states of the traffic lights and traffic lights information. In detail, the states of the traffic lights include the state when the traffic lights are on and the state when the traffic lights are off. The state when the traffic lights are on includes a red light is on, a yellow light is on, a green light is on, or a left turn light is on, a right turn light is on, a straight-ahead light is on. The left turn light, the right turn light, the straight-ahead light and so on include different of colors. The state when the traffic lights are off is the state when all the lights are off. For example, traffic lights only include a red light, a yellow light and a green light, and when the green light blinks, the red light and the yellow light are off. Then when the green light blinks to no light, the traffic lights are on the state when the traffic lights are off. The traffic lights information includes but are not limited to whether the traffic lights are installed with signs. The marked data according to the traffic lights with signs includes a meaning of the signs. For example, if the traffic lights with a sign showing "No right turn", the marked data of the traffic lights include the message "Don't turn right when the traffic lights are red".

In step S106, using the video data and the marked data to generate a recognition model of the traffic lights. The recognition model includes an intelligent model and/or a state machine. The intelligent model is used to identify a static state of the traffic lights and the state machine is used to identify changing process of states of the traffic lights. In this embodiment, the marked data is used to generate the intelligent model. In detail, the marked data can generate the intelligent model through a deep learning technology, etc. The marked data is input into the deep learning model, and characteristics of the traffic lights can be obtained from the marked data through multi-layer filtering. The deep learning model can learn and extract the characteristics through filters, and generate the corresponding intelligent model. The intelligent model can also be generated based on the marked data and any one of existing generic models. For example, the marked data is input into existing traffic lights models according to similar environment for training to generate intelligent models about the traffic lights. The state machine of the traffic lights is generated based on analysis of the video data and the marked data. In detail, the state machine can be generated by automatically or manually analyzing the video data and the marked data of the traffic lights.

In this embodiment, each traffic light includes an intelligent model, which is generated based on the marked data of the corresponding traffic lights. Each traffic light further includes a state machine, which includes all the states of the traffic lights and changing process of the all states of the traffic lights. In other words, each traffic light has an intelligent model and a state machine. Both the intelligent model and the state machine are generated according to actual situation of the traffic lights. Since different traffic lights have different states and changing process, different traffic lights have different intelligent models and state machines. In other embodiments, each traffic light only has an intelligent model or a state machine.

In some embodiments, the recognition model can be directly used to identify the static state of the traffic lights and the changing process of the state of the traffic lights. In other embodiments, the recognition model can also be directly used to identify the static state of the traffic lights or the changing process of the state of the traffic lights.

In step S108, storing the recognition model and the traffic lights information in a high-precision map to generate a high-precision map for recognizing traffic lights. In detail, the recognition model including the intelligent model and the state machine and the traffic lights information of each traffic light are stored in the traffic lights data corresponding to the high-precision map that can be used to recognize the traffic lights.

In the above embodiment, the road test data of the traffic lights is used to generate the recognition model of the traffic lights. The recognition model includes the intelligent model for recognizing the static states of the traffic lights and the state machine for recognizing the changing process of the state of the traffic lights. The intelligent model and the state machine are stored in the high-precision map to generate the high-precision map which can be used to recognize the traffic lights effectively. Because each traffic light has an intelligent model and a state machine, the high-precision map having the intelligent model can recognize all kinds of different traffic lights, which has a wide range of applications.

Figure 2:
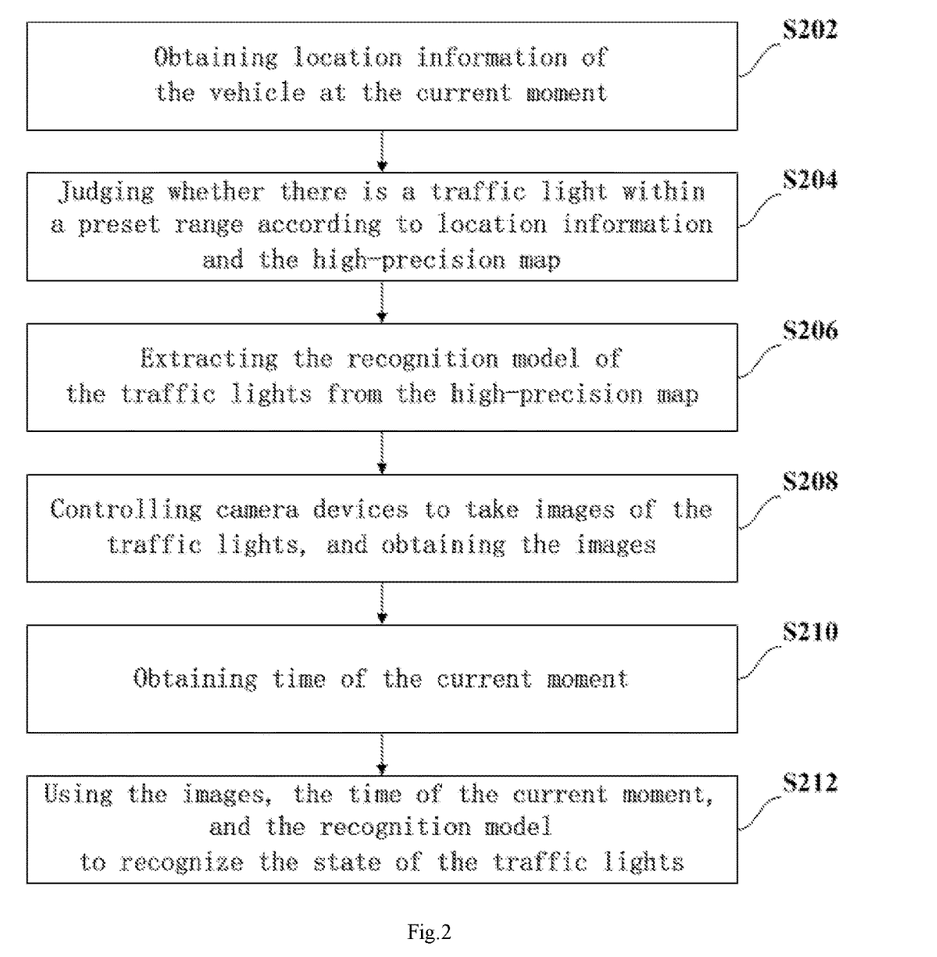
FIG. 2 illustrates the method for recognizing traffic lights in accordance with an embodiment.
Figure 4:
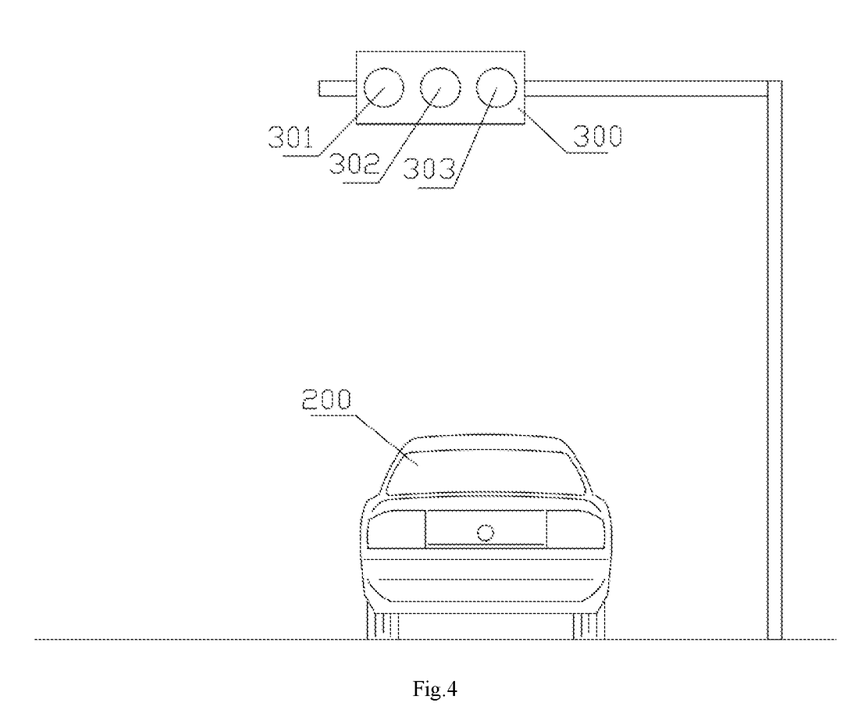
FIG. 4 illustrates a schematic diagram of an environment performing the method for recognizing traffic lights in accordance with an embodiment.

Referring to FIG. 2 and FIG. 4, FIG. 2 illustrates the method for recognizing the traffic lights in accordance with an embodiment and FIG. 4 illustrates a schematic diagram of an environment performing the method for recognizing traffic lights in accordance with an embodiment. The method for recognizing traffic lights utilizes the high-precision map generated by the generation method of high-precision map described above. The method for recognizing the traffic lights include but is not limited to applied to cars, motorcycles, trucks, sport utility vehicles, recreational vehicles, ships, aircraft and other transportation equipment to assist transportation equipment to recognize the traffic lights when driving.

In this embodiment, the method for recognizing the traffic lights is performed in a vehicle 200. The vehicle 200 has a level-four or a level-five autonomous driving system. The level-four autonomous driving system refers to "high automation". Generally, the vehicle with the level-four autonomous driving system can perform its function without a human driver any longer. Even if the human driver dose not respond appropriately to an intervene request, the vehicle is capable of achieving the minimum risk state automatically. The level-five autonomous driving system refers to "full automation". Generally, the vehicle with the level-five autonomous driving system can drive themselves on any legal and drivable road environment. The human driver only needs to set up the destination and turn on the level-five autonomous driving system, and the vehicle can be driven to the designated place through an optimized route.

In the current environment, there is a traffic light 300 at the junction, which includes a red light 301, a yellow light 302, and a green light 303. The green light 303 can blinks. The vehicle 200 is moving in the direction of traffic light 300 and approaching the junction. There is going to describe this embodiment in detail below by taking this current environment as an example. The method for recognizing the traffic lights using high-precision map comprises the following steps.

In step S202, obtaining location information of the vehicle at the current moment. In detail, this disclosure obtains the location information of the vehicle at the current moment through a positioning module (not shown in the drawings) set in vehicle 200. In detail, the positioning module includes but is not limited to global positioning system (GPS), Beidou satellite navigation system, inertial measurement unit (IMU), etc.

In step S204, judging whether there is a traffic light within a preset range according to the location information and the high-precision map. In detail, in this disclosure, a main control device 20 is located in the vehicle 200 to judge whether there is a traffic light 300 within the preset range by the location information and the high-precision map. When there is no traffic light 300 in the preset range, perform step S202. When there is a traffic light 300 exists in the preset range, perform step S206. In this embodiment, the preset range is 50 meters in front of the vehicle 200. In some other embodiments, the preset range can be 30 meters, 80 meters, or 100 meters in front of the vehicle 200. The preset range can also be set according to the actual situation. In the current environment, there is a traffic light 300 in the preset range.

In step S206, extracting the recognition model of the traffic lights from the high-precision map. In detail, this disclosure uses the main control device 20 to extract the recognition model of the traffic lights 300 from the high-precision map. The recognition model comprises an intelligent model and/or a state machine. This disclosure uses the main control device 20 to extract the intelligent model and/or the state machine of the traffic lights from the high-precision map, wherein the intelligent model being configured to identify a static state of the traffic lights, and the state machine being configured to identify changing process of states of the traffic lights. In this embodiment, the recognition model comprises an intelligent model and a state machine. In other embodiments, the recognition model only has an intelligent model or a state machine. In the current environment, the intelligent model of the traffic lights 300 includes following states: the red light is on, the yellow light is on, the green light is on, and all the lights are off. The state machine of the traffic lights 300 includes changing process of all the state changes: the red light is on turns into the green light is on, the green light is on turns into all the lights are off, all the lights are off turn into the green light is on, the green light is on turns into the yellow light is on, the yellow light is on turns into the red light is on.

Figure 5:
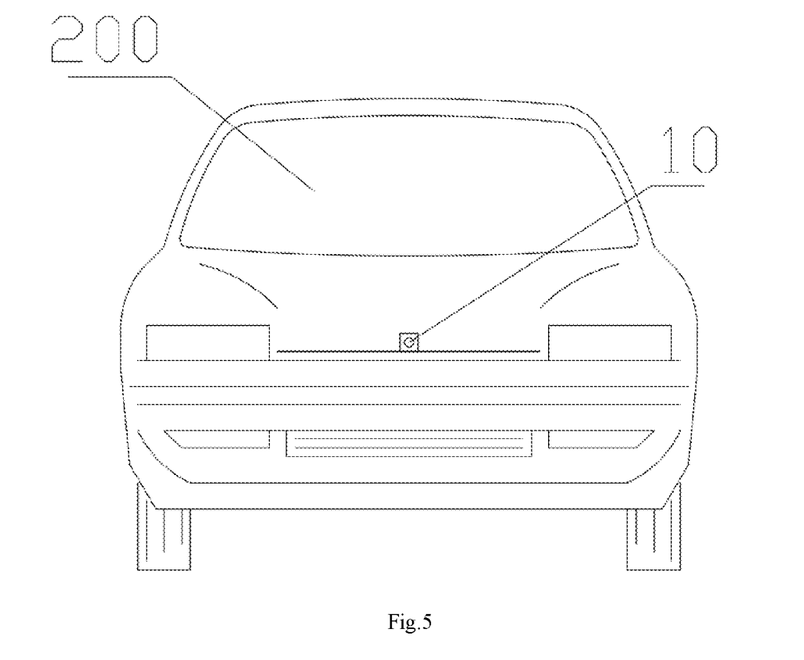
FIG. 5 illustrates a vehicle in accordance with an embodiment.

In step S208, controlling camera devices to take images of the traffic lights, and obtaining the images. In detail, the vehicle 200 is equipped with the camera devices 10. This disclosure uses the main control device 20 control the camera devices 10 to take images and uses the main control device 20 obtain the captured images. Wherein, the images include the traffic lights 300. The camera devices 10 can be installed on the front of the vehicle 200 or on the roof of the vehicle 200. The camera devices 10 can also be installed according to the actual situation. When the camera devices 10 is installed on the vehicle 200, the shooting direction of the camera devices 10 is the same as the driving direction of the vehicle 200 (as shown in FIG. 5).

In step S210, obtaining time of the current moment. In detail, this disclosure uses the main control device 20 to obtain the time of the current moment. The main control device 20 can obtain the time of the current moment through the clock (not shown in the drawings) set on the vehicle 200, and can also obtain the time of the current moment through the wireless network, etc.

In step S212, using the images, the time of the current moment, and the recognition model to recognize the state of the traffic lights.

In detail, this disclosure uses the main control device 20 to input the images and the time of the current moment into the intelligent model, and obtains the first output result from the intelligent model. The first output result includes the state of traffic lights 300 at the current moment. In the current environment, when the traffic lights 300 turns green, the images and the time of the current moment are input to the intelligent model, and the first output result is that the state of the traffic lights 300 at the current moment is the green light is on.

In detail, this disclosure uses the main control device 20 to input the images and the time of the current moment into the state machine, and obtains the second output result from the state machine. The second output result includes the state of traffic lights 300 at the next moment. In the current environment, when the state of traffic lights 300 is green at the current moment, according to the state machine, the state of traffic lights 300 at the next moment may be either all the lights are off or the yellow light is on.

The second output result also includes time label. The time label is the realistic time period corresponding to each state of the traffic lights. In this embodiment, when the data acquisition vehicle conducts road survey and takes video, time nodes at that time will be recorded at the same time. When marking the video data, the corresponding time nodes will be marked. Therefore, the marked data includes the time nodes corresponding to the traffic lights states. In the process of forming the state machine, the realistic time period corresponding to each state is generated according to the traffic lights states and the corresponding time nodes, that is, the time label. For example, a traffic light starts to turn green at 10:00 o'clock every day, ends at 10:02 o'clock, and changes to another state. The traffic light starts to turn green at 10:05 o'clock every day, ends at 10:07 o'clock, and changes to another state. Then, the realistic time period corresponding to the traffic light is green includes 10:00-10:02, and 10:05-10:07. Then, the state at the next moment of traffic lights 300 can be obtained by combining the time of the current moment.

In the current environment, if the time label corresponding to the traffic lights 300 is green includes 8:08-8:09, 8:09:02, 8:09:04, etc. The time label corresponding to the traffic lights 300 is off includes 8:09:01, 8:09:03, etc. The time label corresponding to the traffic lights 300 is yellow includes 8:09:05-8:09:10, etc. The time label corresponding to the traffic lights 300 is red includes 8:09:11-8:11, etc. That is to say, during the period from 8:08 to 8:11, the state changing process of traffic lights 300 is as follows: the green light is on-all the lights are off-the green light is on-all the lights are off-the green light is on-the yellow light is on-the red light is on. If the time of the current moment is 8:08:10, which matches the time label 8:08-8:09, the next state corresponding to the time label is all lights are off. The state machine outputs the state of traffic lights 300 in the next moment is all the lights are off. That is, the green light 303 of traffic lights 300 is about to blink.

In some embodiments, this disclosure can use the main control device 20 to input the images and the time of the current moment into the intelligent model to obtain the first output result, or the state machine to obtain the second output result. In other embodiments, this disclosure can use the main control device 20 to input the images and the time of the current moment into the recognition model to obtain the first output result and the second output result. This disclosure also can use the main control device 20 to input the images and the time of the current moment into the recognition model to obtain the first output result or the second output result.

In the above embodiments, the intelligent model and the state machine stored in the high-precision map are used to recognize the state of the traffic lights at the current moment and the state of the traffic lights at the next moment. When the vehicle reaches the preset range of the traffic lights, the vehicle can retrieve the intelligent model and state machine of the traffic lights from the high-precision map. Because the intelligent model and the state machine correspond to the traffic lights one to one respectively, the current state and the next state of each traffic light can be quickly and accurately recognized through the high-precision map. At the same time, the method provided by this technical solution can recognize all kinds of traffic lights, can ensure the accuracy of recognition, and has a wide range of applications. In addition, the method for recognizing the traffic lights provided by this technical solution can also assist the vehicle to make a reasonable decision on starting or stopping, and help the vehicle to better plan the driving path.

In some embodiments, the vehicle 200 may also has a level-two or level-three autonomous driving system. The level-two autonomous driving system refers to "partial automation". A vehicle with the level-two autonomous driving system requires human drivers to monitor at all times and control the vehicle according to environment. The level-three autonomous driving system refers to "conditional automation". A vehicle with level-three autonomous driving system requires human drivers to take over the vehicle timely within appropriate time. The method for recognizing the traffic lights applied to the level-two or level-three autonomous driving vehicle can assist human drivers to recognize the traffic lights, and help drivers to better judge the current state and the next state of the traffic lights, so as to make better decisions and make driving more easily.

Figure 3:
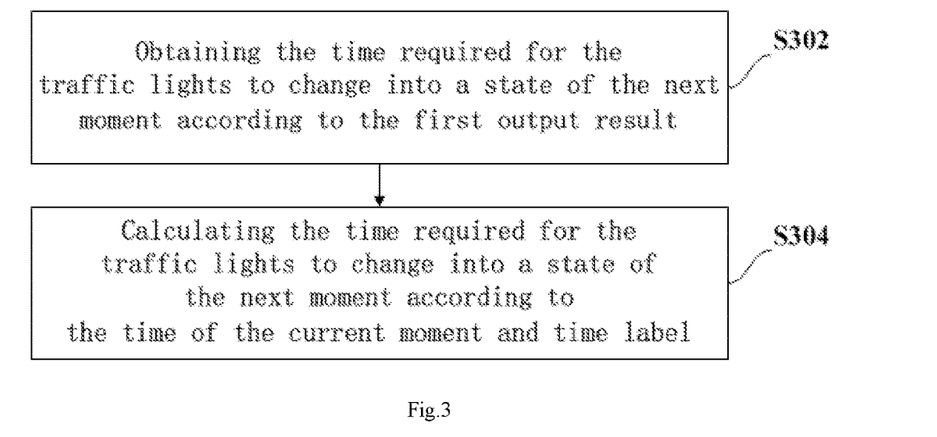
FIG. 3 illustrates the method for recognizing traffic lights in accordance with an embodiment.

Referring to FIG. 3, FIG. 3 illustrates the method for recognizing the traffic lights in accordance with an embodiment. The first output result further includes whether the traffic lights have a countdown module or not. The countdown module is used to indicate how much time remains to change from the current state to the next state. When the traffic lights have a countdown module to output countdown time for the traffic lights from one color to another color, perform step S302. When the traffic lights do not have a countdown module to output countdown time for the traffic lights from one color to another color, perform step S304.

In step S302, obtaining the time required for the traffic lights to change into a state of the next moment according to the first output result. In detail, this disclosure uses the main control device 20 to obtain the time required for the traffic lights 300 to change to the state of the next moment according to the first output result. The first output result also includes the countdown time output by the countdown module at the current moment. For example, the traffic lights 300 have a countdown module. The current state of the traffic lights 300 is green, and the countdown time output by the countdown module is 30, which means that the traffic lights 300 will change into the state of the next moment after 30 seconds.

In step S304, calculating the time required for the traffic lights to change into a state of the next moment according to the time of the current moment and time label. The second output result includes time label, which is realistic time periods corresponding to different traffic lights states. In detail, the disclosure uses the main control device 20 to calculate the time required for the traffic lights to change into the state of the next moment according to the time of the current moment and time label.

First, selecting a maximum time node in the time label. The time label includes the minimum time node and a maximum time node. The minimum time node represents the real time at the beginning of a certain state of the traffic lights, and the maximum time node represents the real time at the end of the state of the traffic lights. In the current environment, the matching time node in the time label is 8:08-8:09, so the minimum time node in the time label is 8:08 and the maximum time node is 8:09.

Second, calculating difference between the time of the current moment and the maximum time node. The difference between the time of the current moment and the maximum time node is the time required for the traffic lights 300 to change into the state of the next moment. In the current environment, the time of the current moment is 8:08:10, and the maximum time node is 8:09, so the difference is 50 seconds. That is, after 50 seconds, the traffic lights 300 change into the state of next moment.

In the above embodiments, the time required for the traffic lights to change into the state of the next moment can be quickly obtained through the countdown module of the traffic lights. When the traffic lights have no countdown module, the time required for the traffic lights to change into the state of the next moment can be calculated through the time of the current moment and the time label, so as to better help the vehicle to make reasonable decisions and planning of the driving path. For the traffic lights without countdown module, the time different can be calculated directly by using the time of the current moment and time label, so as to obtain the time required for the traffic lights to change into the state of the next moment, which greatly reduces the calculation amount.

Figure 6:
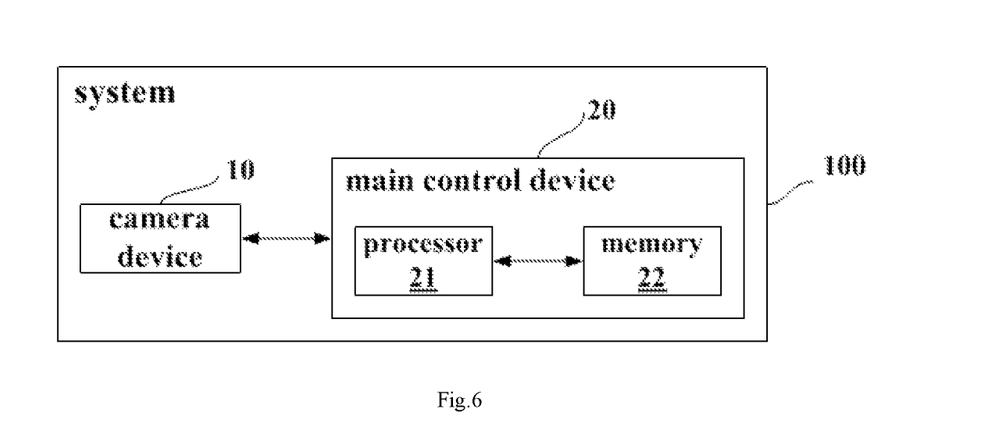
FIG. 6 illustrates a block diagram of the system for recognizing traffic lights in accordance an embodiment.

Referring to FIG. 6, FIG. 6 illustrates a block diagram of the system for recognizing traffic lights in accordance an embodiment. The system 100 for recognizing traffic lights using high-precision map includes a camera device 10 and a main control device 20. The system 100 for recognizing traffic lights can be but not limited to install in cars, motorcycles, trucks, sport utility vehicles, recreational vehicles, ships, aircraft and other transportation equipment. The camera device 10 and the main control device 20 can be integrated or set separately.

In this embodiment, the main control device 20 includes a processor 21 and a memory 22. The memory 22 is configured to store program instructions, and the processor 21 is configured to execute the program instructions to perform the method for recognizing traffic lights using high-precision map.

The processor 21, in some embodiments, may be a Central Processing Unit (CPU), controller, microcontroller, microprocessor, or other data processing chip used to run the program instructions stored in the memory 22 that utilize high-precision map to recognize traffic lights.

The memory 22 includes at least one type of readable storage medium, which includes flash memory, hard disk, multimedia card, card-type memory (for example, SD or DX memory, etc.), magnetic memory, disk, optical disc, etc. Memory 22 in some embodiments may be an internal storage unit of a computer device, such as a hard disk of a computer device. Memory 22, in other embodiments, can also be a storage device for external computer devices, such as a plug-in hard disk, a Smart Media Card (SMC), a Secure Digital (SD) Card, a Flash Card, etc. equipped on a computer device. Further, the memory 22 may include both the internal and external storage units of a computer device. The memory 22 can not only be used to store the application software and all kinds of data installed in the computer equipment, such as the code to realize the method for recognizing traffic lights using high-precision map, but also can be used to temporarily store the data that has been output or will be output.

In the above embodiments, it may be achieved in whole or in part by software, hardware, firmware, or any combination thereof. When implemented in software, it can be implemented in whole or in part as a computer program product.

The computer program product includes one or more computer instructions. When the computer program instructions are loaded and executer on a computer, a process or function according to the embodiment of the disclosure is generated in whole or in part. The computer device may be a general-purpose computer, a dedicated computer, a computer network, or other programmable device. The computer instruction can be stored in a computer readable storage medium, or transmitted from one computer readable storage medium to another computer readable storage medium. For example, the computer instruction can be transmitted from a web site, computer, server, or data center to another web site, computer, server, or data center through the cable (such as a coaxial cable, optical fiber, digital subscriber line) or wireless (such as infrared, radio, microwave, etc.). The computer readable storage medium can be any available medium that a computer can store or a data storage device such as a serve or data center that contains one or more available media integrated. The available media can be magnetic (e.g., floppy Disk, hard Disk, tape), optical (e.g., DVD), or semiconductor (e.g., Solid State Disk), etc.

The technicians in this field can clearly understand the specific working process of the system, device and unit described above, for convenience and simplicity of description, can refer to the corresponding process in the embodiment of the method described above, and will not be repeated here.

In the several embodiments provided in this disclosure, it should be understood that the systems, devices and methods disclosed may be implemented in other ways. For example, the device embodiments described above is only a schematic. For example, the division of the units, just as a logical functional division, the actual implementation can have other divisions, such as multiple units or components can be combined with or can be integrated into another system, or some characteristics can be ignored, or does not perform. Another point, the coupling or direct coupling or communication connection shown or discussed may be through the indirect coupling or communication connection of some interface, device or unit, which may be electrical, mechanical or otherwise.

The unit described as a detached part may or may not be physically detached, the parts shown as unit may or may not be physically unit, that is, it may be located in one place, or it may be distributed across multiple network units. Some or all of the units can be selected according to actual demand to achieve the purpose of this embodiment scheme.

In addition, the functional units in each embodiment of this disclosure may be integrated in a single processing unit, or may exist separately, or two or more units may be integrated in a single unit. The integrated units mentioned above can be realized in the form of hardware or software functional units.

The integrated units, if implemented as software functional units and sold or used as independent product, can be stored in a computer readable storage medium. Based on this understanding, the technical solution of this disclosure in nature or the part contribute to existing technology or all or part of it can be manifested in the form of software product. The computer software product stored on a storage medium, including several instructions to make a computer equipment (may be a personal computer, server, or network device, etc.) to perform all or part of steps of each example embodiments of this disclosure. The storage medium mentioned before includes U disk, floating hard disk, ROM (Read-Only Memory), RAM (Random Access Memory), floppy disk or optical disc and other medium that can store program codes.

It should be noted that the embodiments number of this disclosure above is for description only and do not represent the advantages or disadvantages of embodiments. And in this disclosure, the term "including", "include" or any other variants is intended to cover a non-exclusive contain. So that the process, the devices, the items, or the methods includes a series of elements not only include those elements, but also include other elements not clearly listed, or also include the inherent elements of this process, devices, items, or methods. In the absence of further limitations, the elements limited by the sentence "including a . . . " do not preclude the existence of other similar elements in the process, devices, items, or methods that include the elements.

The above are only the preferred embodiments of this disclosure and do not therefore limit the patent scope of this disclosure. And equivalent structure or equivalent process transformation made by the specification and the drawings of this disclosure, either directly or indirectly applied in other related technical fields, shall be similarly included in the patent protection scope of this disclosure.

The invention claimed is:

1. A method for recognizing traffic lights using high-precision map having a recognition model for recognizing traffic lights, comprising: obtaining location information of a vehicle at a current moment; judging whether there is a traffic light within a preset range according to the location information and the high-precision map; extracting the recognition model of the traffic lights from the high-precision map when there is a traffic light within the preset range; controlling camera devices to take images of the traffic lights, and obtaining the images; obtaining time of the current moment; and using the images, the time of the current moment, and the recognition model to recognize a state of the traffic lights.

2. The method as claimed in claim 1, wherein the recognition model comprises an intelligent model and/or a state machine, the method further comprises: extracting the intelligent model and/or the state machine of the traffic lights from the high-precision map, the intelligent model being configured to identify a static state of the traffic lights, the state machine being configured to identify a state change of the traffic lights.

3. The method as claimed in claim 2, further comprising: inputting the images and the time of the current moment into the intelligent model, and obtaining the first output result from the intelligent model, the first output result comprising states of traffic lights at the current moment; and/or inputting the images and the current moment into the state machine, and obtaining the second output result from the state machine, the second output result comprising a state of the traffic lights at the next moment.

4. The method as claimed in claim 3, wherein the first output result further comprises whether the traffic lights have a countdown module, the method further comprises: when the traffic lights have a countdown module to output countdown time for the traffic lights to change from one color to another color, obtaining time required for the traffic lights to change into a state of the next moment according to the first output result, the first output result further comprising the countdown time output by the countdown module at the current moment; and when the traffic lights do not have a countdown module to output countdown time for the traffic lights to change from one color to another color, calculating time required for the traffic lights to change into a state of the next moment according to the current moment and a time label, the second output result comprising the time label, which is a realistic time period corresponding to different traffic light states.

5. The method as claimed in claim 4, further comprising: selecting a maximum time node in the time label; and calculating difference between the time of the current moment and the maximum tune node.

6. The method as claimed in claim 1, further comprising: inputting the images and the current moment into the recognition model, and obtaining the first output result and the second output result from the recognition model, the first output result comprising states of traffic lights at the current moment, the second output result comprising a state of the traffic lights at the next moment.

7. A system for recognizing traffic lights using high-precision map, comprising: a camera device; and a main control device, the main control device comprises: a memory configured to store program instructions, and a processor configured to execute the program instructions to perforin method for recognizing traffic lights using high-precision map having a recognition model for recognizing traffic lights, comprises: obtaining location information of a vehicle at a current moment; judging whether there is a traffic light within a preset range according to the location information and the high-precision map; extracting the recognition model of the traffic lights from the high-precision map when there is a traffic light within the preset range; controlling the camera device to take images of the traffic lights, and obtaining the images; obtaining time of the current moment; and using the images, the time of the current moment, and the recognition model to recognize a state of the traffic lights.

8. The system as claimed in claim 7, wherein the recognition model comprises an intelligent model and/or a state machine, the system further comprises: extracting the intelligent model and/or the state machine of the traffic lights from the high-precision map, the intelligent model being configured to identify a static state of the traffic lights, the state machine being configured to identify a state change of the traffic lights.

9. The system as claimed in claim 8, further comprising: inputting the images and the time of the current moment into the intelligent model, and obtaining the first output result from the intelligent model, the first output result comprising the states of the traffic lights at the current moment; and/or inputting the images and the current moment into the state machine, and obtaining the second output result from the state machine, the second output result comprising states of the traffic lights at the next moment.

10. The system as claimed in claim 9, wherein the first output result further comprises whether the traffic lights have a countdown module, the method further comprises: when the traffic lights have a countdown module to output countdown time for the traffic lights to change from one color to another color, obtaining time required for the traffic lights to change into a state of the next moment according to the first output result, the first output result further comprising the countdown time output by the countdown module at the current moment; and when the traffic lights do not have a countdown module to output countdown time for the traffic lights to change from one color to another color, calculating time required for the traffic lights to change into a state of the next moment according to the current moment and a time label, the second output result comprising the time label, which is a realistic time period corresponding to different traffic light states.

11. The system as claimed in claim 10, further comprising: selecting a maximum time node in the time label; and calculating difference between the time of the current moment and the maximum time node.

12. The system as claimed in claim 7, further comprising: inputting the images and the current moment into the recognition model, and obtaining the first output result and the second output result from the recognition model, the first output result comprising a state of traffic lights at the current moment, the second output result comprising a state of the traffic lights at the next moment.

\* \* \* \* \*